(12) United States Patent
Grier et al.

(10) Patent No.: US 7,351,953 B2
(45) Date of Patent: *Apr. 1, 2008

(54) APPARATUS AND METHOD TO GENERATE AND CONTROL OPTICAL TRAPS TO MANIPULATE SMALL PARTICLES

(75) Inventors: David Grier, Chicago, IL (US); Ward Lopes, Chicago, IL (US)

(73) Assignee: Arryx, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,975

(22) Filed: Sep. 19, 2006

(65) Prior Publication Data

US 2007/0023622 A1  Feb. 1, 2007

Related U.S. Application Data

(63) Continuation of application No. 10/510,529, filed as application No. PCT/US03/10936 on Apr. 10, 2003, now Pat. No. 7,161,140.

(51) Int. Cl.
*H05H 3/02* (2006.01)
*G02B 5/18* (2006.01)
*G02B 5/32* (2006.01)

(52) U.S. Cl. .......................... 250/251; 359/15

(58) Field of Classification Search .............. None
See application file for complete search history.

(56) References Cited

U.S. PATENT DOCUMENTS 5,939,716 A * 8/1999 Neal ........................ 250/251
6,055,106 A * 4/2000 Grier et al. ................ 359/566
7,161,140 B2 * 1/2007 Grier et al. ................ 250/251

OTHER PUBLICATIONS

J. Arlt and M.J. Padgett. "Generation of a beam with a dark focus surrounded by areas of higher intensity: The optical bottle beam," Opt. Lett. 25, 191-193, 2000.
L. Paterson, M.P. MacDonald, J Arlt, W. Sibbett, P.E. Bryant, and K. Dholakia, "Controlled rotation of optically trapped microscopic particles," Science 292, 912-914, 2001.

* cited by examiner

*Primary Examiner*—Nikita Wells
(74) *Attorney, Agent, or Firm*—Jean C. Edwards, Esq.; Akerman Senterfitt

(57) ABSTRACT

The present invention relates generally to an apparatus and method to generating and controlling optical traps for manipulation of small particles. An upstream modification of an input laser beam provides a beam with a square or other preselected, cross section of intensity which can be used to form optical traps with a corresponding cross section of intensity.

81 Claims, 3 Drawing Sheets

APPARATUS AND METHOD TO GENERATE
AND CONTROL OPTICAL TRAPS TO
MANIPULATE SMALL PARTICLES

CROSS REFERENCE TO RELATED
APPLICATIONS

This application is a 37 CFR 1.53(b) Continuation of U.S. patent application Ser. No. 10/510,529, filed Oct. 7, 2004 now U.S. Pat. No. 7,161,140, which is a U.S. National Stage Application of International Application Number PCT/US03/10936, filed Apr. 10, 2003, which claims priority to U.S. patent application Ser. No. 10/120,748, filed Apr. 10, 2002, the entire contents of which are incorporated herein in their entirety.

BACKGROUND OF THE INVENTION

Throughout this application various publications are referenced. The disclosures of these publications in their entireties are hereby incorporated by reference in this application in order to more fully describe the state of the art to which this invention pertains.

1. Field of the Invention

The present invention relates generally to optical traps. In particular, the invention relates to an apparatus, system and method for applying optical gradient forces to form a plurality of optical traps to manipulate small particles.

2. Discussion of the Related Arts

An optical tweezer is an optical tool which utilizes the gradient forces of a focused beam of light to manipulate particles with dielectric constants higher than the surrounding media. To minimize its energy such particles will move to the area where the electric field is the highest. Stated in terms of momentum, the focused beam of light produces radiation pressure, creating small forces by absorption, reflection, diffraction or refraction of the light by a particle. The forces generated by radiation pressure are almost negligible—a light source, such as a diode-pumped Nd:YAG laser operating at 10 mW, will only produce a few picoNewtons. However, a few picoNewtons of force is sufficient to manipulate small particles.

Other optical tools which can be used to manipulate small particles include, but are not limited to, optical vortices, optical bottles, optical rotators and light cages. An optical vortex, although similar in use to an optical tweezer, operates on an different principle.

An optical vortex produces a gradient surrounding an area of zero electric field which is useful to manipulate particles with dielectric constants lower than the surrounding media or which are reflective, or other types of particles which are repelled by an optical tweezer. To minimize its energy such a particle will move to the area where the electric field is the lowest, namely the zero electric field area at the focal point of an appropriately shaped laser beam.

The optical vortex provides an area of zero electric field much like the hole in a doughnut (toroid). The optical gradient is radial with the highest electric field at the circumference of the doughnut. The optical vortex detains a small particle within the hole of the doughnut. The detention is accomplished by slipping the vortex over the small particle along the line of zero electric field.

The optical bottle differs from an optical vortex in that it has a zero electric field only at the focus and a non-zero electric field at an end of the vortex. An optical bottle may be useful in trapping atoms and nanoclusters which may be too small or too absorptive to trap with an optical vortex or optical tweezers. J. Arlt and M. J. Padgett. "Generation of a beam with a dark focus surrounded by areas of higher intensity: The optical bottle beam," Opt. Lett. 25, 191-193, 2000.

The optical rotator provides a pattern of spiral arms which trap objects. Changing the pattern causes the trapped objects to rotate. L. Paterson, M. P. MacDonald, J Arlt, W. Sibbett, P. E. Bryant, and K Dholakia, "Controlled rotation of optically trapped microscopic particles," Science 292, 912-914, 2001. This class of tool may be useful for manipulating non-spherical particles and driving MEMs devices or nanomachinery.

The light cage, (Neal in U.S. Pat. No. 5,939,716) is loosely, a macroscopic cousin of the optical vortex. A light cage forms a time-averaged ring of optical tweezers to surround a particle too large or reflective to be trapped with dielectric constants lower than the surrounding medium. If the optical vortex is like a doughnut, the light cage is like a jelly-filled doughnut. While the doughnut hole (for the vortex) is an area of zero electric field, the jelly-fill is an area of lowered electric field. In a gross sense, the gradient forces of the plurality of optical tweezers forming the doughnut "push" a particle, with a dielectric constant lower than the surrounding medium, towards the jelly-fill which may also be thought of as the less bright area which lies between the plurality of optical tweezers. However, unlike a vortex, no-zero electric field area is created. An optical vortex, although similar in use to an optical tweezer, operates on an opposite principle.

Using a single beam of laser light with a diffractive optical element to form a plurality of diffracted laser beams focused to form an array of optical traps is known in the art. U.S. Pat. No. 6,055,106 issued to Grier and Dufresne describes arrays of optical traps. The Grier and Dufresne patent teaches the use of a dynamic optical element and a focusing lens to diffract the input light beam and generate an array of movable optical traps. The array of optical traps is formed from a single input beam by having an appropriate shape at the back aperture beam diameter. Specifically, that a gaussian $TEM_{00}$ input laser beam should have a beam diameter which substantially coincides with the diameter of the back aperture.

One limitation of having the beam diameter of a gaussian $TEM_{00}$ input laser beam substantially coincides with the diameter of the back aperture is that as shown from a cross sectional view (FIG. 1) a gaussian $TEM_{00}$ beam has much less intensity at its periphery The resulting optical traps will have a similar cross section of intensity.

Accordingly, there has existed a need to have an input beam fill the back aperture and produce optical traps with greater intensity at the periphery. The present invention satisfies these and other needs, and provides further related advantages.

SUMMARY OF THE INVENTION

The present invention provides a novel method and system to use gradient forces to generate and control an array of optical traps.

The present invention provides a novel and improved method, system and apparatus for generating, monitoring and controlling an array of optical traps. The optical traps separately, or in concert, can manipulate small particles.

The present invention employs a first phase patterning optical element, to shape the phase profile of the an input beam of light or energy upstream from a second phase patterning optical element which in turn diffracts the input beam into a plurality of beams.

By patterning the phase of the input beam with the upstream phase patterning optical element the patterned input beam's cross section can be selected to have a substantially even intensity (FIG. 2) even near its periphery. The substantially even intensity of the patterned input beam can be transferred to each beamlet. Accordingly, the plurality of beams produced from the second phase patterning optical element can both have a beam width which coincides with the back aperture of a focusing lens and generate optical traps with greater intensity at the periphery of the optical traps than those optical traps produced from unpatterned input beams which have less intensity at there periphery.

To alter the position of a given optical trap, the beam forming that trap may be steered to a new position with only the second phase patterning optical element, thereby altering the position of the optical trap resulting therefrom.

In other embodiments the first and second phase patterning optical elements may work together to alter the position of a given optical trap, by steering the beam forming that trap and thereby altering the position of that optical trap.

The selective generation and control of the array of optical may be useful in a variety of commercial applications, such as, optical circuit design and manufacturing, nanocomposite material construction, fabrication of electronic components, opto-electronics, chemical and biological sensor arrays, assembly of holographic data storage matrices, rotational motor, mesoscale or nanoscale pumping, energy source or optical motor to drive MEMS, facilitation of combinatorial chemistry, promotion of colloidal self-assembly, manipulation of biological materials, interrogating biological material, concentrating selected biological material, investigating the nature of biological material, and examining biological material.

The activity of the optical trap array, may be observed via an optical data stream (FIG. 5) by placing a beam splitter in the optical pathway. Viewing can be enhanced by introducing a filter to limit the passage of un-diffracted, scattered or reflected light along the pathway of the optical data stream thus reducing this noise which can disrupt video or other monitoring of the optical data stream.

Other features and advantages of the present invention will be set forth, in part, in the descriptions which follow and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appendent claims.

DETAILED DESCRIPTION OF THE PREFERRED EMBODIMENTS

Certain terminology will be used in the following specification, for convenience and reference and not as a limitation, brief definitions are provided below:
  A. "Beamlet" refers to a sub-beam of focused light or other source of energy that is generated by directing a focused beam of light or other source of energy, such as that produced by a laser or collimated output from a light emitting diode, through a media which diffracts it into two or more sub-beams. An example of a beamlet would be a higher order laser beam diffracted off of a grating.
  B. "Phase profile" refers to the phase of light or other source of energy in a cross-section of a beam.
  C. "Phase patterning" refers to imparting a patterned phase shift to a focused beam of light, other source of energy or beamlet which alters its phase profile, including, but not limited to, phase modulation, mode forming, splitting, converging, diverging, shaping and otherwise steering a focused beam of light, other source of energy or a beamlet.

Figure 1:
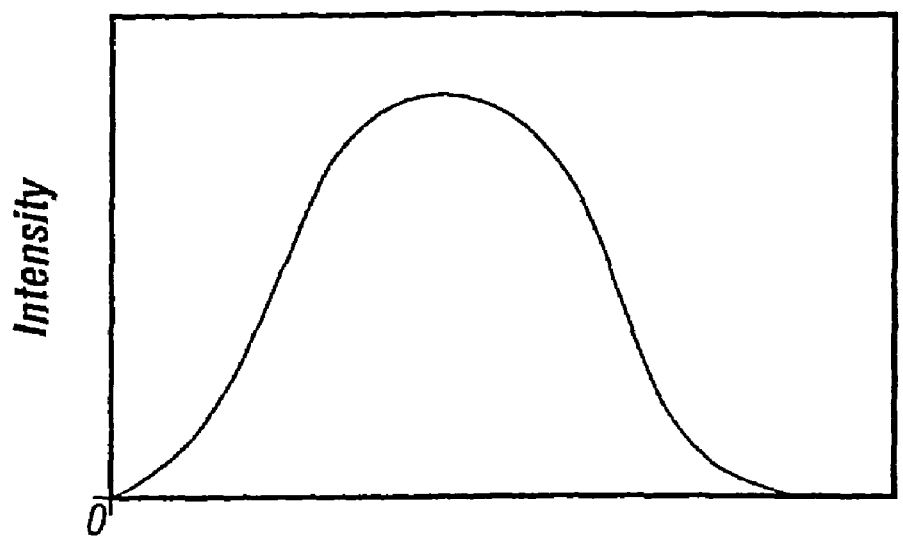
FIG. 1 is a chart of the intensity of an unmodified gaussian beam's cross section.

A preferred embodiment of the inventive apparatus for forming a plurality of movable optical traps, generally designated as 10, is shown in FIG. 1. A movable array of optical traps is formed by generating a focused beam of energy, such as electromagnetic wave energy. In the preferred embodiments, the electromagnetic waves are light waves, preferably having a wavelength of from about 400 nm to about 1060 nm, and more preferably having a wavelength in the green spectrum. The beam is formed of a collimated light, such as the collimated guassian beam output from a laser beam 12, as shown in FIG. 1.

The laser beam 12 is directed through area "A" of a first phase patterning optical element 13, situated upstream from the second phase patterning optical element 14, in a plane conjugate 15 to the planar surface 17 at the back aperture 18 of a focusing lens 20. The preferred embodiment of the focusing lens 20 is an objective lens. The phase profile of the laser beam 12 is patterned by the first phase patterning optical element 14 to form a modified laser beam 22 which is directed at the second phase patterning optical element 14. The second phase patterning optical element 14 has a reflective variable surface medium 24 which the modified laser beam 22 passes through at area "B" which is disposed substantially opposite the planar surface 17 at the back aperture 18.

Beamlets 26 and 28 are formed as the modified laser beam 22 passes through the second phase patterning optical element 14. Each beamlet's 26 and 28 phase profile is selected as the beamlets 26 & 28 are formed. The beamlets then pass through area "C" at the back aperture 18 and are then converged by the focusing lens 20 to form a the optical traps 1000 and 1002 in working focal area 2000 of a vessel 2001. The vessel 2001 constructed of a substantially transparent material, which allows the beamlets to pass through and which does not interfere with the formation of the optical traps.

The second phase patterning optical element may also work in cooperation with the focuing lens 20 to converge the beamlets. The beam diameter w of the beamlets is substantially coincide with the diameter of the back aperture 18.

Altering the variable surface medium 24 of the second phase patterning optical element selectively patterns the phase profile of each beamlet.

The working focal area 2000 is that area where a media containing particles or other material to be examined, measured or manipulated by the optical traps 1000 and 1002 is located.

For clarity, only two optical traps 1000 and 1002 are shown, but it should be understood that an array of such optical traps can created by the second phase patterning optical element 14.

Any suitable laser can be used as the source of the laser beam 12. Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

Figure 2:
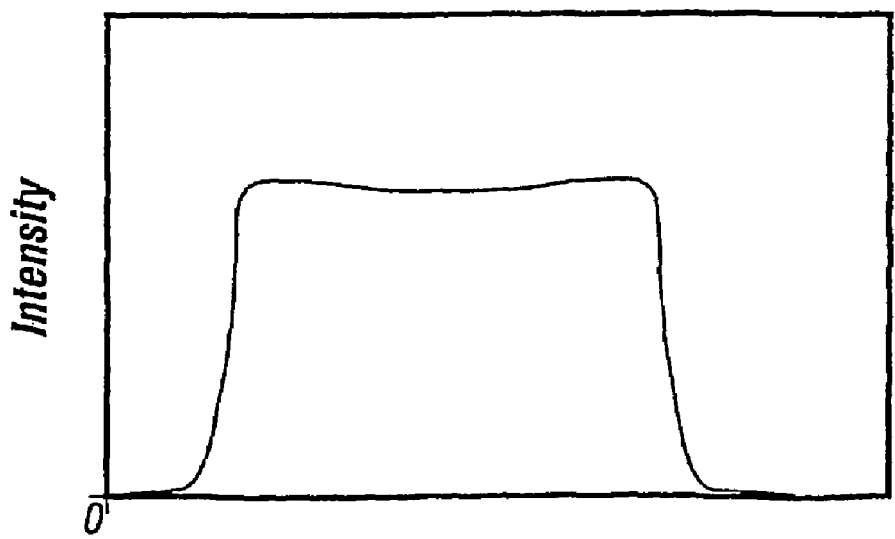
FIG. 2 is a chart of the intensity of a modified gaussian beam with a square cross section

The upstream or first phase patterning optical element is used to at least impart a square cross section (FIG. 2) to the wavefront of the laser beam 12 resulting in a modified laser beam 22 with a square cross section of substantially even intensity. Accordingly, when the beam diameter w of the modified laser beam substantially coincides with the diameter of the back aperture 18 the periphery of the modified laser beam 22 has greater intensity then the periphery of the input beam 12 and the corresponding optical traps 1000 and 1002 will have a corresponding intensity at their periphery. The first phase patterning optical element may also impart different selected wavefronts depending on the parameter of the system, which may include a wavefront which is most intense at the periphery.

In the embodiments shown in FIGS. 3-6 the type, number orientation and position of each optical trap 1000 & 1002 can be selectively controlled by the hologram encoded on the variable surface medium 24 of the second phase patterning optical element 14 which is used to pattern the phase profile of each beamlet. It is a significant feature of the invention that movement of each trap, be it rotation in a fixed position, rotation in a non-fixed position, two-dimensional and three dimensional, continuous and stepped is selectively controllable. The control in this embodiment is achieved by at least varying the hologram formed in the surface medium 24 of the second phase patterning optical element 14.

Figure 4:
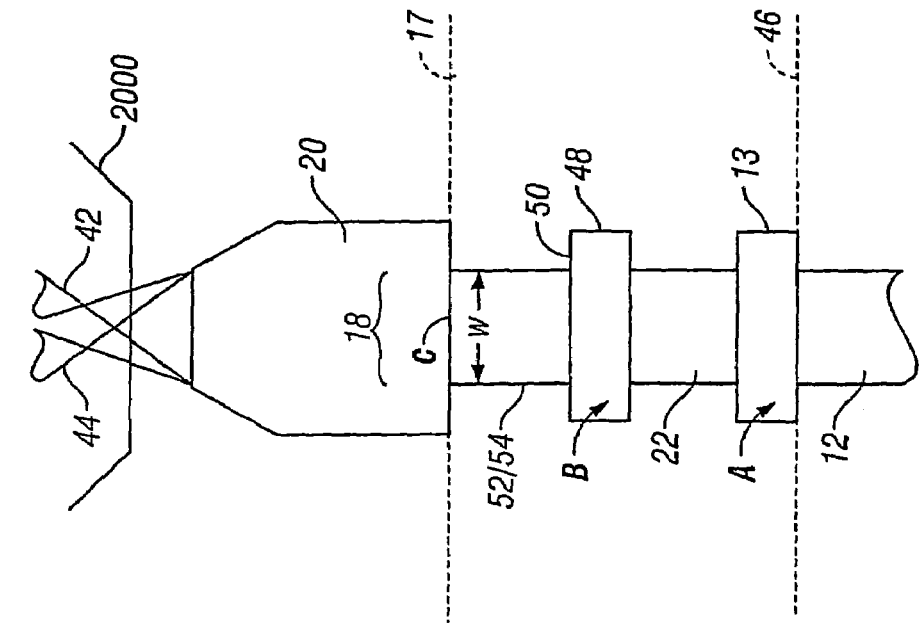
FIG. 4 illustrates a dual transmissive embodiment of a system for generating optical traps to manipulate small particles.
Figure 3:
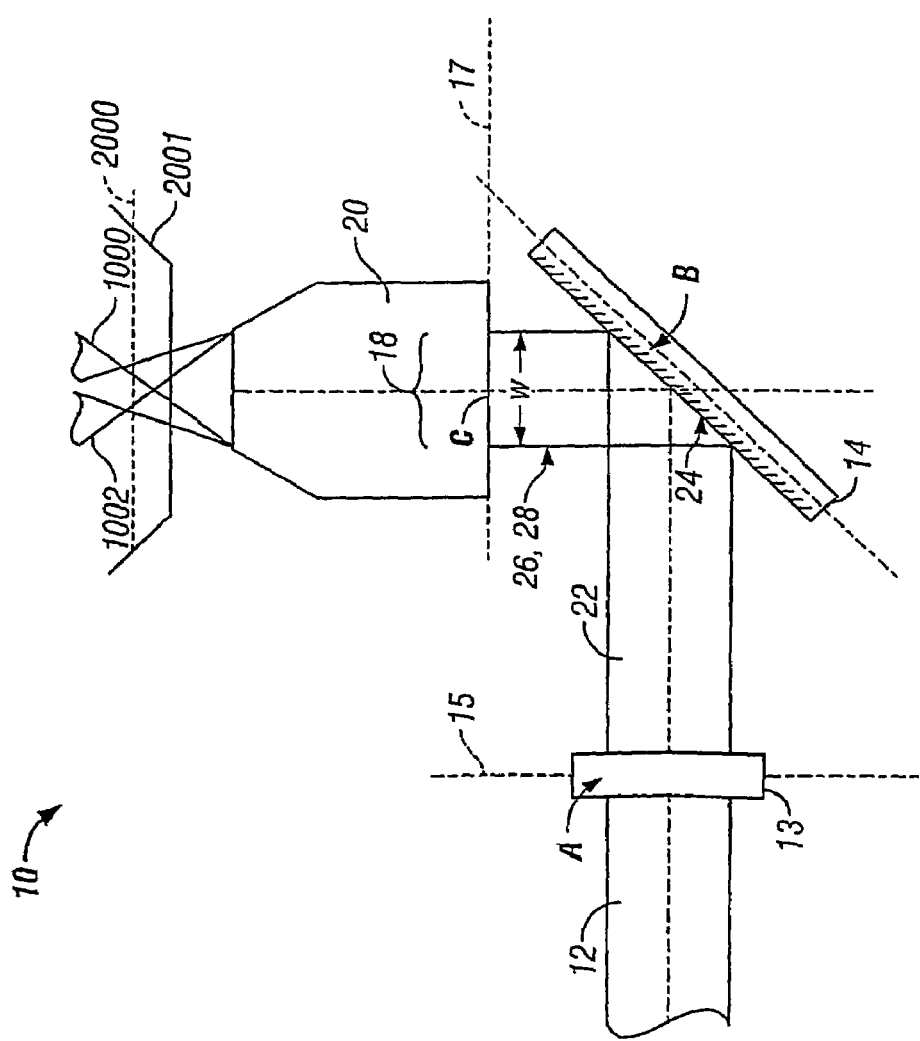
FIG. 3 illustrates a preferred embodiment of a system for generating optical traps to manipulate small particles.
Figure 5:
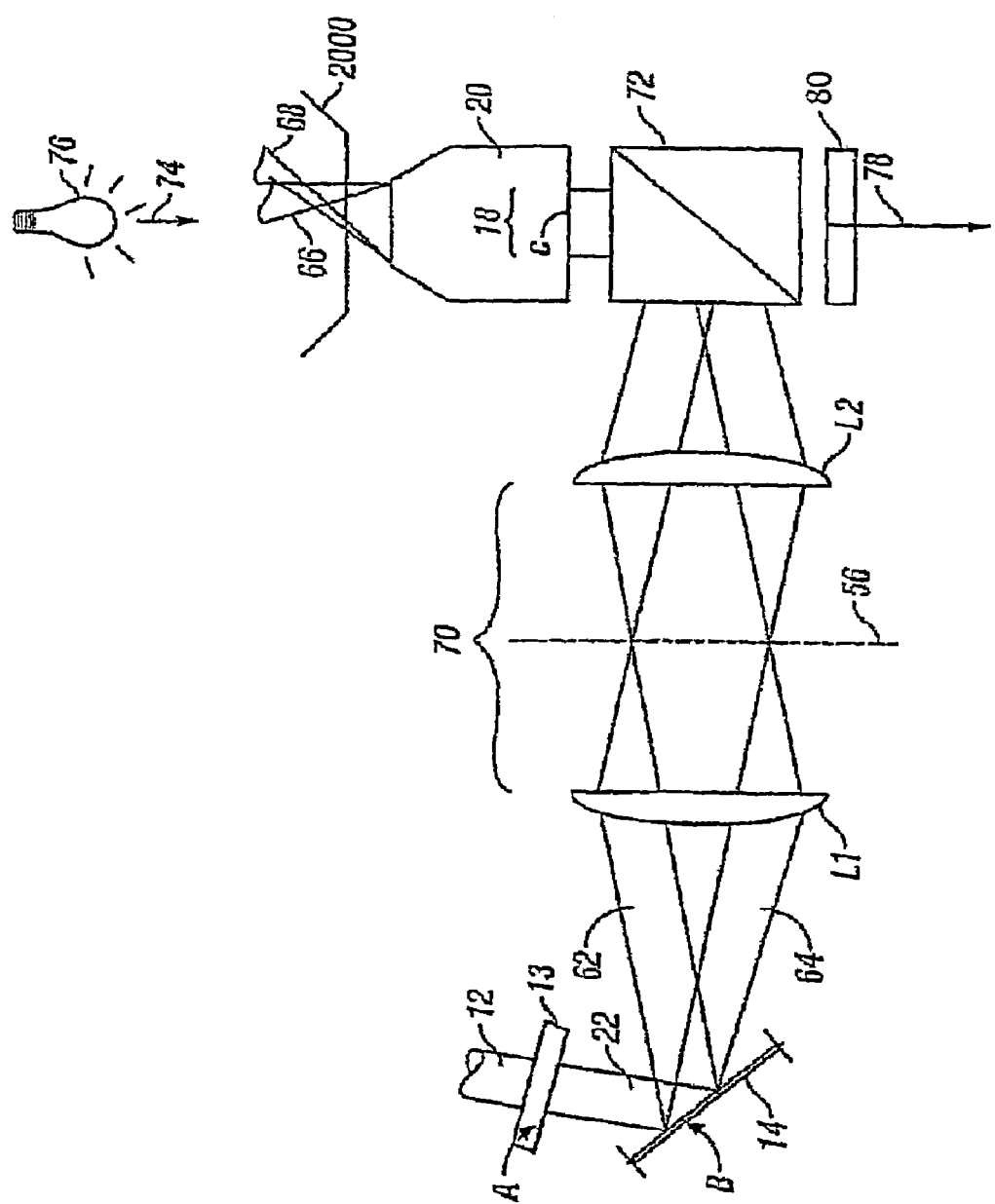
FIG. 5 illustrates an embodiment of a system for generating optical traps to manipulate small particles with transfer lenses.

Moreover, depending on the type of optical trap desired, the phase patterned by the second phase patterning optical element 16 may include wavefront shaping, phase shifting, steering, diverging and converging to form different classes of optical traps including optical tweezers, optical vortices, optical bottles, optical rotators, light cages, and combinations of the different classes Suitable phase patterning optical elements are characterized as transmissive or reflective depending on how they direct the focused beam of light. Transmissive phase patterning optical elements, as shown in FIGS. 3, 4 and 5, allow the laser beam 12, or in the case of FIG. 4 the laser beam 12 and modified laser beam 22, to pass through. Reflective phase patterning optical elements, as shown in FIGS. 3 and 5, reflect the modified laser beam 22. The upstream, first, phase patterning optical element although shown as a transmissive element in the figures may instead be reflective without departing from the scope of the invention.

Within the two general groups, a phase patterning optical element can be formed from either static or dynamic media. Examples of suitable static phase patterning optical elements include diffractive optical elements with a fixed surface, such as gratings, including diffraction gratings, reflective gratings, transmissive gratings, holograms, stencils, light shaping holographic filters, polychromatic holograms, lenses, mirrors, prisms, waveplates and the like.

The static phase patterning optical element may have different areas, each area configured to impart a different phase profile to the beamlets. In such embodiments, the surface of the static phase patterning optical element can be varied by moving the surface relative to the laser beam to select the appropriate area to change the desired characteristics imparted to the beamlets, i.e., to change the desired phase profile of at least one of the resulting beamlets.

Examples of suitable dynamic phase patterning optical elements having a time dependent aspect to their function include variable computer generated diffractive patterns, variable phase shifting materials, variable liquid crystal phase shifting arrays, micro-mirror arrays, piston mode micro-mirror arrays, spatial light modulators, electro-optic deflectors, accousto-optic modulators, deformable mirrors, reflective MEMS arrays and the like. With a dynamic phase patterning optical element, the features of the surface can be encoded, as previously noted to form a hologram and altered, for example, by a computer, to effect a change in the hologram which can affect the number of beamlets, the phase profile of at least one of the beamlets, and the location of at least one of the beamlets.

Preferred dynamic phase patterning optical elements include phase-only spatial light modulators such as the "PAL-SLM series X7665, manufactured by Hamamatsu of Japan, or "SLM 512SA7" and "SLM 512SA15" both manufactured by Boulder Nonlinear Systems of Lafayette Colo. These encodeable phase pattern optical elements are computer controllable and multifunctional, so that they can generate the beamlets 26 and 28 by diffracting the modified laser beam 15 and selectively impart desired phase profile (characteristic) to the resulting beamlets.

Turning to the embodiment shown in FIG. 4, the controllable optical traps 42 and 44 are formed by passing the laser beam 12 through area "A" of the first phase patterning optical element 13 which is disposed substantially in a plane 46 opposite the planar surface 17 at the back aperture 18 through which the phase profile of the laser beam 12 is patterned to form a modified laser beam 22 which is directed at a second phase patterning optical element 48.

The second phase patterning optical element 48 has a transmissive variable surface medium 50 which the modified laser beam 22 passes through at area "B" which is disposed substantially opposite the planar surface 17 at the back aperture 18. Beamlets 52 and 54 are formed as the modified laser beam 22 passes through the second phase patterning optical element 48. Each beamlet's 52 and 54 phase profile is selected as the beamlets are formed. The beamlets then pass through area "C" at the back aperture 18 and are then converged by the focusing lens 20 to form the optical traps 42 and 44 in working focal area 2000. The beam diameter "w" of the modified laser beam 22 substantially coincides with the diameter of the back aperture 18. Altering the variable surface medium 50 of the second phase patterning optical element selectively patterns the phase profile of each beamlet.

For clarity, only two optical traps 42 and 44 are shown, but it should be understood that an array of such optical traps can created by the second phase patterning optical element 48.

The embodiment shown in FIG. 5, using additional transfer optics, in some cases can minimize beamlet misalignments. Transfer optics may be particularly useful when the beamlets 62 and 64 are generated off a reflective second phase patterning optical element, or when a data stream to allow behind the focusing lens observation of the activity of the optical traps 66 and 68 is desirous.

A conventional telescope system 70 is disposed between the second phase patterning optical element 14 and a beam splitter 72. The beam splitter 72 is constructed of a dichroic mirror, photonic band gap mirror, omni directional mirror, or other similar device. The beam splitter 72 selectively reflects the wavelength of light used to form the optical traps (beamlets 62 and 64) and transmits other wavelengths such as the imaging illumination 74 provided by an illumination source 76 above the focusing lens 20. The portion of light reflected from the beam splitter 72, which is used to form the optical traps, is then passed through an area "C" of the back aperture 18 of the focusing lens 20.

The imaging illumination 74 passes through the working area 200, along the optical axis of the focusing lens, forming an optical data stream 78 corresponding to the phase profile and location of one or more of the beamlets, derived from the location and position of a small particle contained by an optical trap.

An optical filter element 80, such as a polarizing element or band pass element, is placed within the pathway of the optical data stream 78 to reduce the amount of reflected, scattered or undiffracted laser light passing along the axis of the optical data stream. The filter element 80 filters out one or more preselected wavelengths and, in some embodiments, all but a preselected wavelength of the optical data stream 78.

The optical data stream 78 can then be viewed, converted to a video signal, monitored, or analyzed by visual inspection of an operator, spectroscopically, and/or video monitoring. The optical data stream 78 may also be processed by a photodectector to monitor intensity, or any suitable device to convert the optical data stream to a digital data stream adapted for use by a computer.

To trap small particles an operator and/or the computer will adjust the second phase patterning optical element 14 to direct the movement of each optical trap to acquire a selected small particle and trap it. The plurality of optical traps with contained small particles can then be configured and reconfigured. Using the optical data stream, the position and identity of one or more of the trapped small particles can be monitored, via video camera, spectrum, or an optical data stream which provides a computer controlling the selection of probes and generation of optical traps information useful to adjusting the type of small particles contained by the optical traps. The movement can be tracked based on predetermined movement of each optical trap caused by encoding the phase patterning optical element. Additionally a computer may be used to maintain a record of each probe contained in each optical trap.

Other features and advantages of the present invention will be set forth, in part, in the descriptions which follow and the accompanying drawings, wherein the preferred embodiments of the present invention are described and shown, and, in part, will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appendant claims.

What is claimed is:

1. An apparatus for trapping particles by forming optical traps, comprising:
    a first phase patterning optical element which receives a laser beam and one of patterns a phase profile of said laser beam, and imparts a selected wavefront to said laser beam;
    a second phase patterning optical element disposed downstream from said first phase patterning optical element, which receives said laser beam and one of patterns a phase profile of said laser beam, and imparts a selected wavefront to said laser beam;
    wherein at least two beamlets are formed from said laser beam; and
    a focusing lens having a front and a back aperture, said focusing lens being disposed downstream from said second phase patterning optical element;
    wherein the second phase patterning optical element in cooperation with said focusing lens, can separately converge said beamlets and establish gradient conditions to form optical traps capable of manipulating the particles.

2. The apparatus according to claim 1, wherein said first and said second phase patterning optical elements are each one of transmissive and reflective.

3. The apparatus according to claim 1, wherein said first and said second phase patterning optical elements are each one of static and dynamic.

4. The apparatus according to claim 3, wherein each of said first and said second phase patterning optical elements is selected from the group consisting of gratings, diffraction gratings, reflective gratings, transmissive gratings, holograms, stencils, light shaping holographic filters, polychromatic holograms, lenses, mirrors, prisms, and waveplates.

5. The apparatus according to claim 3, wherein each of the first and second phase patterning optical elements is dynamic and selected from the group consisting of variable computer generated diffractive patterns, variable phase shifting materials, variable liquid crystal phase shifting arrays, micro-mirror arrays, piston mode micro-mirror arrays, spatial light modulators, electro-optic deflectors, acousto-optic modulators, deformable mirrors, and reflective MEMS arrays.

6. The apparatus according to claim 3, wherein at least one of the first and second phase patterning optical elements is a phase-only spatial light modulator.

7. The apparatus according to claim 1, further comprising:
    means for generating a laser beam.

8. The apparatus according to claim 7, wherein the means for generating the laser beam is selected from the group comprising solid state lasers, diode pumped lasers, gas lasers, dye lasers, alexandrite lasers, free electron lasers, VCSEL lasers, diode lasers, Ti-Sapphire lasers, doped YAG lasers, doped YLF lasers, diode pumped YAG lasers, and flash lamp-pumped YAG lasers.

9. The apparatus according to claim 1, wherein said focusing lens is an objective lens.

10. The apparatus according to claim 1, further comprising:
    a beam splitter disposed opposite the back aperture of the focusing lens, whereby beamlets can be directed at the back aperture and an optical data stream can pass along the optical axis of the focusing lens from front to back aperture.

11. The apparatus according to claim 10, further comprising:
an optical filter selected from the group comprising polarizing and band pass filters, disposed along the optical axis of the focusing lens and behind the beam splitter.

12. The apparatus according to claim 1, further comprising:
at least one telescope system disposed between upstream from the focusing lens and downstream from the second phase patterning optical element.

13. The apparatus according to claim 10, further comprising:
at least one telescope lens system disposed upstream from the beam splitter.

14. The apparatus according to claim 10, further comprising:
at least one telescope lens system disposed downstream from the beam splitter.

15. The apparatus according to claim 10, further comprising:
at least one telescope lens system disposed upstream and downstream from the beam splitter.

16. The apparatus according to claim 1, wherein a cross-section applied to the selected wavefront is substantially square.

17. The apparatus according to claim 1, wherein a cross-section applied to the selected wavefront is intense at its periphery.

18. A system for trapping particles by forming movable optical traps comprising:
a first phase patterning optical element which receives a laser beam and imparts a selected cross section to said laser beam;
a second phase patterning optical element which receives the laser beam from said first phase patterning optical element, and imparts a selected cross section to said laser beam;
at least one computer;
wherein at least one of said first and said second phase patterning optical elements is a dynamic phase patterning optical element, and said dynamic phase patterning optical element has a variable surface encoded, by the computer, with a hologram;
wherein movable beamlets can be formed from the laser beam received at the second phase patterning optical element; and
an objective lens with a front and a back aperture disposed downstream from the second phase patterning optical element;
wherein the second phase patterning optical element in cooperation with said objective lens can separately converge beamlets and establish the gradient conditions to form optical traps capable of manipulating the particles.

19. The system according to claim 18, further comprising:
means for generating a laser beam.

20. The system according to claim 18, further comprising:
a beam splitter disposed opposite the back aperture of the focusing lens, whereby beamlets can be directed at the back aperture and an optical data stream can pass along the optical axis of the focusing lens from front to back aperture.

21. The system according to claim 18, further comprising:
means for converting the optical data stream to a digital data stream adapted for use by a computer.

22. The system according to claim 18, further comprising:
at least one telescope system disposed upstream from the objective lens.

23. The system according to claim 20, further comprising:
at least one telescope system disposed upstream from the beam splitter.

24. The system according to claim 20, further comprising:
at least one telescope lens system disposed downstream from the beam splitter.

25. The system according to claim 20, further comprising:
at least one telescope lens system disposed upstream and downstream from the beam splitter.

26. The system according to claim 21, further comprising:
an illumination source.

27. The system according to claim 18, wherein said selected cross-section is substantially square.

28. The apparatus according to claim 18, wherein said selected cross-section is intense at its periphery.

29. An apparatus for trapping particles by forming optical traps, comprising:
a first phase patterning optical element which receives a laser beam and imparts one of a predetermined intensity and patterns a predetermined phase profile to said laser beam to achieve a selected wavefront to said laser beam;
a second phase patterning optical element disposed downstream from said first phase patterning optical element, which receives said laser beam and one of imparts a predetermined intensity and patterns a predetermined phase profile to said laser beam to achieve another selected wavefront to said laser beam;
wherein at least two beamlets are formed from said resulting laser beam; and
a focusing lens having a front and a back aperture, said focusing lens being disposed downstream from said second phase patterning optical element;
wherein the second phase patterning optical element in cooperation with said focusing lens, can separately converge said beamlets and establish gradient conditions to form optical traps capable of manipulating the particles.

30. The apparatus according to claim 29, wherein said first and said second phase patterning optical elements are each one of transmissive and reflective.

31. The apparatus according to claim 29, wherein said first and said second phase patterning optical elements are each one of static and dynamic.

32. The apparatus according to claim 31, wherein each of said first and said second phase patterning optical elements is selected from the group consisting of gratings, diffraction gratings, reflective gratings, transmissive gratings, holograms, stencils, light shaping holographic filters, polychromatic holograms, lenses, mirrors, prisms, and waveplates.

33. The apparatus according to claim 31, wherein each of the first and second phase patterning optical elements is dynamic and selected from the group consisting of variable computer generated diffractive patterns, variable phase shifting materials, variable liquid crystal phase shifting arrays, micro-mirror arrays, piston mode micro-mirror arrays, spatial light modulators, electro-optic deflectors, acousto-optic modulators, deformable mirrors, and reflective MEMS arrays.

34. The apparatus according to claim 29, wherein at least one of the first and second phase patterning optical elements is a phase-only spatial light modulator.

35. The apparatus according to claim 29, further comprising:
means for generating a laser beam.

36. The apparatus according to claim 35, wherein the means for generating the laser beam is selected from the group comprising solid state lasers, diode pumped lasers, gas lasers, dye lasers, alexandrite lasers, free electron lasers, VCSEL lasers, diode lasers, Ti-Sapphire lasers, doped YAG lasers, doped YLF lasers, diode pumped YAG lasers, and flash lamp-pumped YAG lasers.

37. The apparatus according to claim 29, wherein said focusing lens is an objective lens.

38. The apparatus according to claim 29, further comprising:
a beam splitter disposed opposite the back aperture of the focusing lens, whereby beamlets can be directed at the back aperture and an optical data stream can pass along the optical axis of the focusing lens from front to back aperture.

39. The apparatus according to claim 38, further comprising:
an optical filter selected from the group comprising polarizing and band pass filters, disposed along the optical axis of the focusing lens and behind the beam splitter.

40. The apparatus according to claim 29, further comprising:
at least one telescope system disposed between upstream from the focusing lens and downstream from the second phase patterning optical element.

41. The apparatus according to claim 38, further comprising:
at least one telescope lens system disposed upstream from the beam splitter.

42. The apparatus according to claim 38, further comprising:
at least one telescope lens system disposed downstream from the beam splitter.

43. The apparatus according to claim 38, further comprising:
at least one telescope lens system disposed upstream and downstream from the beam splitter.

44. The apparatus according to claim 29, wherein a cross-section applied to the selected wavefront is substantially square.

45. The apparatus according to claim 29, wherein a cross-section applied to the selected wavefront is intense at its periphery.

46. A system for trapping particles by forming movable optical traps comprising:
a first phase patterning optical element which receives a laser beam and imparts one of a predetermined intensity and patterns a predetermined phase profile to said laser beam to achieve a selected cross section to said laser beam;
a second phase patterning optical element disposed downstream from said first phase patterning optical element, which receives said laser beam and one of imparts a predetermined intensity and patterns a predetermined phase profile to said laser beam to achieve a selected cross section to said laser beam;
at least one computer;
wherein at least one of said first and said second phase patterning optical elements is a dynamic phase patterning optical element, and said dynamic phase patterning optical element has a variable surface encoded, by the computer, with a hologram;
wherein movable beamlets can be formed from the laser beam received at the second phase patterning optical element; and
an objective lens with a front and a back aperture disposed downstream from the second phase patterning optical element;
wherein the second phase patterning optical element in cooperation with said objective lens can separately converge beamlets and establish the gradient conditions to form optical traps capable of manipulating the particles.

47. The system according to claim 46, further comprising:
means for generating a laser beam.

48. The system according to claim 46, further comprising:
a beam splitter disposed opposite the back aperture of the focusing lens, whereby beamlets can be directed at the back aperture and an optical data stream can pass along the optical axis of the focusing lens from front to back aperture.

49. The system according to claim 46, further comprising:
means for converting the optical data stream to a digital data stream adapted for use by a computer.

50. The system according to claim 46, further comprising:
at least one telescope system disposed upstream from the objective lens.

51. The system according to claim 48, further comprising:
at least one telescope system disposed upstream from the beam splitter.

52. The system according to claim 48, further comprising:
at least one telescope lens system disposed downstream from the beam splitter.

53. The system according to claim 48, further comprising:
at least one telescope lens system disposed upstream and downstream from the beam splitter.

54. The system according to claim 49, further comprising:
an illumination source.

55. The system according to claim 46, wherein said selected cross section is substantially square.

56. The system according to claim 46, wherein said selected cross section is intense at its periphery.

57. The system according to claim 46, wherein at least one of the first and second phase patterning optical elements is a phase-only spatial light modulator.

58. A method for trapping particles, comprising:
directing a laser beam at a first phase patterning optical element;
controlling one of a phase profile and an intensity of said laser beam using said first phase patterning optical element to achieve a selected cross section to a wavefront of said laser beam;
directing said laser beam from said first phase patterning optical element to a second phase patterning optical element which controls one of a phase profile and an intensity of said modified laser beam to achieve a selected cross section to said wavefront of said laser beam;
generating at least two beamlets from said second phase patterning optical element;
generating optical traps within a vessel by directing said laser beam through a focusing lens;
providing a plurality of the particles; and
containing the particles within the optical traps.

59. The method according to claim 58, wherein said selected cross section is square.

60. The method according to claim 58, wherein said selected cross section is intense at its periphery.

61. The method according to claim 58, further comprising:
controlling movement of each optical trap using a computer.

62. The method according to claim 58, wherein each optical trap is independently movable.

63. The method according to claim 58, further comprising:
providing an optical data stream.

64. The method according to claim 62, further comprising:
receiving said optical data stream with a computer.

65. The method according to claim 64, further comprising:
analyzing said optical data stream with said computer.

66. The method according to claim 65, wherein said computer directs movement of at least one optical trap based on said analysis of said optical data stream.

67. The method according to claim 63, further comprising:
converting said optical data stream to a video signal.

68. The method according to claim 67, further comprising:
receiving said video signal with a computer.

69. The method according to claim 68, further comprising:
analyzing said video signal with said computer.

70. The method according to claim 69, further comprising:
directing movement of at least one optical trap based on said analysis of said video signal by said computer.

71. The method according to claim 67, further comprising:
displaying an image based on said video signal.

72. The method according to claim 71, further comprising:
displaying said image and directing movement of at least one optical trap based on commands from an operator.

73. The method according to claim 63, wherein said optical data stream is spectroscopic data.

74. The method according to claim 73, further comprising:
directing movement of at least one optical trap based on an analysis of said spectroscopic data.

75. The method according to claim 58, wherein said optical traps are formed of a plurality of optical tweezers, optical vortices, optical bottles, optical rotators, and light cages.

76. The method according to claim 58, wherein said selected cross section is most intense at its periphery.

77. The apparatus according to claim 1, wherein the particles are defined as biological materials, chemical materials, optomechanical components, electrical components, and nanomaterials.

78. The system according to claim 18, wherein the particles are defined as biological materials, chemical materials, optomechanical components, electrical components, and nanomaterials.

79. The apparatus according to claim 28, wherein the particles are defined as biological materials, chemical materials, optomechanical components, electrical components, and nanomaterials.

80. The system according to claim 46, wherein the particles are defined as biological materials, chemical materials, optomechanical components, electrical components, and nanomaterials.

81. The method according to claim 58, wherein the particles are defined as biological materials, chemical materials, optomechanical components, electrical components, and nanomaterials.

* * * * *